April 28, 1931. S. K. KALEBDJIAN 1,802,653
NONSKIDDING DEVICE
Filed March 17, 1930
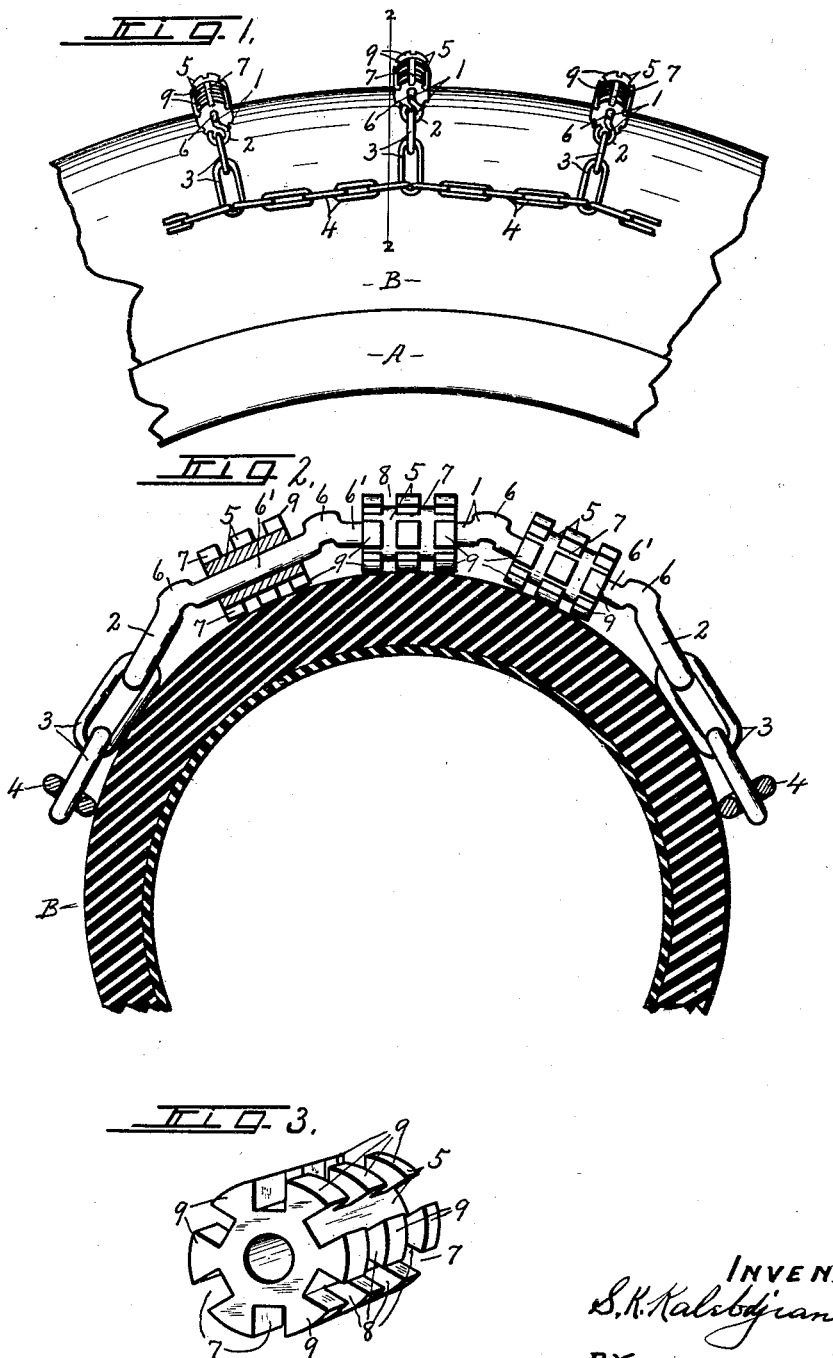
WITNESS
INVENTOR
S. K. Kalebdjian
BY
Denison & Thompson
ATTORNEYS Patented Apr. 28, 1931

1,802,653

UNITED STATES PATENT OFFICE

SETRAK K. KALEBDJIAN, OF SYRACUSE, NEW YORK

NONSKIDDING DEVICE

Application filed March 17, 1930. Serial No. 436,461.

This invention relates to a non-skid device for vehicle wheels and refers more particularly to the cross members of an articulated armor adapted to extend around and upon the pneumatic tires of automobile wheels with the cross members engaged with the tread of the tire.

The main object is to greatly increase the useful life of the cross members and at the same time to render the cross members more efficient in resisting longitudinal and transverse skidding than has heretofore been practised.

One of the specific objects is to journal one or more rollers directly upon a cross-bar rod or wire and to provide said wire with means for holding the roller against undue endwise movement so that the latter may shift its position rotarily to enable different portions thereof to contact with the ground or pavement.

Another object is to provide the rollers of the several cross members with lengthwise and annular grooves to increase their tractional resistance against skidding longitudinally or laterally when adjusted for use upon the tire of the wheel.

Other objects and uses relating to specific parts of the device will be brought out in the following description.

In the drawings:

Figure 1 is an end face view of a portion of the tire and rim of a vehicle wheel with a corresponding portion of the non-skid armor mounted thereon.

Figure 2 is an enlarged cross sectional view taken in the plane of line 2—2, Figure 1, except that one of the rollers and portions of the side chains are shown in section and the inner portion of the tire and rim broken away.

Figure 3 is a perspective view of one of the detached rollers.

In order that the invention may be clearly understood I have shown the rim —A— and pneumatic tire —B— of a vehicle wheel upon which the non-skid device is adapted to be mounted.

This non-skid device preferably comprises a plurality of similar bars or wires —1— having their ends provided with eyes or loops —2— adapted to be connected by links —3— to opposite side chains —4— so that the cross bars or wires —1— will be arranged in substantially uniformly spaced relation lengthwise of the side chains.

Each of the cross bars or wires —1— carries a plurality of, in this instance three, rollers —5— arranged in uniformly spaced relation lengthwise thereof and free to rotate thereon as shown more clearly in Figure 2, said rod or wire being provided with offset portions or shoulders —6— located between the adjacent ends of the rollers and also at the outer ends of the outermost rollers to hold said rollers against undue axial movement on the rod or wire —1— and still permit free rotation of the rollers on the cylindrical portions of the wires between the offsets —6—.

Each of the cross bars or wires —1— extends transversely across the tread of the tire and is preferably made more or less concavo-convex longitudinally with its concave side facing the tire and conforming somewhat closely to the transverse contour thereof.

The portions of the cross rod or wire —1— between the offset portions —6— form cylindrical bearings —6'— for the adjacent rollers —5— to permit automatic angular movement of the rollers on their respective bearings independently of each other when the armor is adjusted for use upon the tire and thereby to present different faces of the rollers to the pavement for increasing the useful life of the rollers.

That is, as the rollers —5— of the several cross bars or wires —1— are successively brought into contact with the pavement or during their rotation with the wheel they are free to move angularly about their respective bearings —6'— and in actual practice to actually shift more or less irregularly thereby presenting different faces of the rollers to the pavement so that the wear thereon is distributed throughout the circumference of each roller which greatly adds to the longevity of the armor as a whole.

In order to further increase the tractional resistance of the device against circumferential or lateral skidding each roller is provided with a series of lengthwise grooves —7— and a plurality of annular grooves —8— in the periphery thereof, the lengthwise grooves being arranged in uniformly spaced relation circumferentially while the annular grooves may also be arranged in uniformly spaced relation thereby forming a plurality of rows of raised bosses —9— having their outer faces concentric with the axis of the roller for contact with the tread of the tire and also with the pavement.

These bosses —9— constitute what may be termed lengthwise ribs and annular ribs which obviously will afford better traction on snow and soft earth than would be possible if the rollers were exactly cylindrical throughout their lengths thereby greatly increasing the safety of travel in addition to the increased longevity of the armor as a whole.

It will be observed that the cross rods or wires —1— extend across the tread portions only of the tire equal distances to opposite sides of the longitudinal center thereof and that under these conditions the intermediate roller —5— will engage the tread of the tire along said longitudinal center while the remaining rollers will engage the tread of the tire at relatively short distances from and at opposite sides of the center roller thus bringing the outer faces of the rollers in different planes to better resist lateral skidding by reason of the fact that any tendency of the wheel to skid laterally would be resisted by the engagement of the end faces of the rollers in the direction of such skidding.

The cross rods or wires —1— may be permanently attached to the side chains except that the eyes —2— may be opened by suitable tools if necessary to permit the removal and replacement of the rod or wire —1— with the rollers —5— thereon.

The side chains —4— are usually divided through one side and provided with suitable means whereby the ends of each chain may be attached to or detached from each other.

In the manufacture of the cross members consisting of the cross wires —1— and rollers —5— the cross wires are first cut to the required length from straight bars of steel or equivalent hard material after which the rollers —5— are threaded thereon and placed in proper relation to each other.

The straight rod or wire with the rollers thereon are then placed in a suitable form or die (not necessary to here illustrate or describe) but adapted when brought together to press the rod or wire —1— to the required form to produce the offset portions —6— and eyes —2— but it is evident that instead of offsetting the portions —6— outwardly they may be offset in any other direction, the same being also true of the eyes —2—, without departing from the spirit of this invention.

What I claim is:—

1. In a non-skid device for pneumatic tires, a wire adapted to extend across the tread of the tire, and rollers journaled on the wire, said wire having offset portions at opposite ends of each roller for limiting the axial movement of the rollers on the wire.

2. In a non-skid device for tires, a rod adapted to extend across the tread of the tire, and a tread roller journaled on the rod and provided with intersecting peripheral grooves having flat sides to form sharp corners with the periphery of the roller.

In witness whereof I have hereunto set my hand this 6th day of March, 1930.

SETRAK K. KALEBDJIAN.